(12) United States Patent
Nanavati et al.

(10) Patent No.: US 12,175,414 B2
(45) Date of Patent: Dec. 24, 2024

(54) SYSTEM AND METHOD FOR DISPATCHING DRIVERS FOR DELIVERING GROCERY ORDERS AND FACILITATING DIGITAL TIPPING

(71) Applicant: Walmart Apollo, LLC, Bentonville, AR (US)

(72) Inventors: Arpan Y. Nanavati, Castro Valley, CA (US); Austin Smith, Burlingame, CA (US); Vidyanand Krishnan, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 1073 days.

(21) Appl. No.: 16/264,415

(22) Filed: Jan. 31, 2019

(65) Prior Publication Data
US 2020/0250613 A1    Aug. 6, 2020

(51) Int. Cl.
G06Q 10/0835    (2023.01)
G06Q 20/32    (2012.01)

(52) U.S. Cl.
CPC ..... *G06Q 10/0835* (2013.01); *G06Q 20/3223* (2013.01)

(58) Field of Classification Search
CPC ......... G06Q 10/08355; G06Q 10/0834; G06Q 30/0613; G06Q 30/0633; G06Q 30/0639; G06Q 30/0641
See application file for complete search history.

(56) References Cited

U.S. PATENT DOCUMENTS 7,263,668 B1 *   8/2007   Lentz ................... G06F 3/0482
                                                                        715/800
7,716,091 B2     5/2010   Ross
(Continued)

FOREIGN PATENT DOCUMENTS

CN     111369288 A  *  7/2020
EP     3876173 A1  *  9/2021  ............. G06N 20/00
(Continued)

OTHER PUBLICATIONS

Joseph Pisani, "Should you tip the Uber driver? Here's what to give them", published by Taiwan News, on Jul. 28, 2016 (Year: 2016).*
(Continued)

*Primary Examiner* — Omar Zeroual
(74) *Attorney, Agent, or Firm* — BRYAN CAVE LEIGHTON PAISNER LLP

(57) ABSTRACT

A system can comprise one or more processors; and one or more non-transitory computer-readable media storing computing instructions configured to run on the one more processors and perform a method for dispatching a delivery driver and allowing the user to electronically tip the delivery driver. The method in this embodiment can comprise: receiving a delivery request from a user; and determining whether the order is eligible for delivery. When the order is eligible for delivery, the method in this embodiment can determine a delivery fee for the order; after the payment of the fees, dispatch the delivery driver; and upon a confirmation of the delivery, determine whether the completed delivery is eligible for tipping. When the delivery driver for the completed delivery is eligible for tipping, the method in this embodiment can further provide a tipping request to the user; and upon receipt of a confirmation of a tip, forward the tip to the delivery driver. Other embodiments are disclosed.

20 Claims, 9 Drawing Sheets

(56) References Cited

U.S. PATENT DOCUMENTS

| | | | |
|---|---|---|---|
| 7,797,164 | B2 | 9/2010 | Junger et al. |
| 8,104,682 | B2 | 1/2012 | Junger |
| 8,429,019 | B1* | 4/2013 | Yeatts .................. G06Q 10/083 705/26.1 |
| 8,831,975 | B2* | 9/2014 | Golden .................. G06Q 30/00 705/14.1 |
| 8,965,791 | B1* | 2/2015 | Bell ...................... G06Q 20/202 705/17 |
| 9,393,981 | B1 | 7/2016 | Lee et al. |
| 9,934,530 | B1* | 4/2018 | Iacono ............... G06Q 30/0639 |
| 10,127,517 | B2* | 11/2018 | Carr .................... G06Q 30/0633 |
| 10,176,448 | B1* | 1/2019 | Rhodes .................. G01S 19/14 |
| 10,346,889 | B1* | 7/2019 | Reiss .................. G06Q 10/0833 |
| 10,348,916 | B2* | 7/2019 | Nagata .................. G06F 9/451 |
| 10,366,381 | B2* | 7/2019 | Bell ..................... G06Q 20/204 |
| 10,410,194 | B1* | 9/2019 | Grassadonia .......... G06Q 50/12 |
| 10,430,926 | B1* | 10/2019 | Cook .................... G06F 40/106 |
| 10,467,601 | B1* | 11/2019 | Bricca ................. G06F 16/9566 |
| 10,636,019 | B1* | 4/2020 | Abrons ................ G06Q 30/0207 |
| 10,754,916 | B1* | 8/2020 | Rehn .................. G06Q 10/0833 |
| 10,778,598 | B1* | 9/2020 | Fritz ..................... H04L 47/12 |
| 10,915,855 | B2* | 2/2021 | Sharma ............... G06Q 10/0836 |
| 10,997,645 | B1* | 5/2021 | Philbin .................. G01S 19/52 |
| 11,074,539 | B2* | 7/2021 | Tiderington ........... G07C 5/008 |
| 11,120,394 | B2* | 9/2021 | Anderson ............ G06Q 10/0836 |
| 11,244,299 | B1* | 2/2022 | Pittack ............... G06Q 20/3224 |
| 11,315,190 | B1* | 4/2022 | Brandmaier ........... G08G 1/205 |
| 2001/0037320 | A1* | 11/2001 | Allport ............... G06Q 30/0283 705/408 |
| 2002/0007299 | A1* | 1/2002 | Florence .......... G06Q 10/08355 705/7.12 |
| 2002/0046076 | A1* | 4/2002 | Baillargeon ........... G06Q 10/02 705/5 |
| 2003/0177072 | A1 | 9/2003 | Bared |
| 2004/0205568 | A1* | 10/2004 | Breuel .................. G06F 40/166 715/205 |
| 2005/0043996 | A1* | 2/2005 | Silver .................... G06Q 50/12 705/15 |
| 2005/0071758 | A1* | 3/2005 | Ehrich .................... G06F 9/451 715/234 |
| 2006/0149577 | A1 | 7/2006 | Stashluk, Jr. et al. |
| 2006/0178951 | A1* | 8/2006 | Rund .................. G06Q 10/0836 705/14.1 |
| 2006/0235739 | A1* | 10/2006 | Levis .................. G06Q 10/08 705/1.1 |
| 2007/0011017 | A1* | 1/2007 | Field .................... G06Q 10/083 705/330 |
| 2007/0192200 | A1 | 8/2007 | Weng |
| 2007/0198339 | A1* | 8/2007 | Shen .................. G06Q 30/0276 705/14.64 |
| 2007/0237096 | A1* | 10/2007 | Vengroff .................. H04W 4/02 370/254 |
| 2008/0221964 | A1 | 9/2008 | Berkovitz et al. |
| 2009/0005987 | A1 | 1/2009 | Vengroff et al. |
| 2009/0099965 | A1* | 4/2009 | Grant, IV .......... G06Q 20/3433 705/41 |
| 2009/0106124 | A1 | 4/2009 | Yang |
| 2010/0115040 | A1 | 5/2010 | Sargent et al. |
| 2011/0004562 | A1 | 1/2011 | Hennessy et al. |
| 2012/0066008 | A1 | 3/2012 | Scudder et al. |
| 2013/0185124 | A1* | 7/2013 | Aaron .................. G06Q 20/326 705/13 |
| 2013/0198042 | A1* | 8/2013 | Seifen .................. G06Q 10/083 705/26.81 |
| 2013/0246301 | A1* | 9/2013 | Radhakrishnan .. G06Q 30/0282 705/347 |
| 2014/0025524 | A1* | 1/2014 | Sims .................. G06Q 30/0639 705/330 |
| 2014/0052613 | A1* | 2/2014 | Tavakoli ............ G06Q 20/3224 705/39 |
| 2014/0067499 | A1* | 3/2014 | Stepanovich ...... G06Q 30/0214 705/14.16 |
| 2014/0160143 | A1* | 6/2014 | Ballestad .................. G06T 5/92 345/589 |
| 2014/0164126 | A1 | 6/2014 | Nicholas et al. |
| 2014/0278635 | A1 | 9/2014 | Fulton et al. |
| 2014/0351033 | A1* | 11/2014 | Azevedo ............ G06Q 30/0239 705/14.19 |
| 2015/0019384 | A1 | 1/2015 | Fabian et al. |
| 2015/0039450 | A1* | 2/2015 | Hernblad .............. G06Q 20/202 705/15 |
| 2015/0100433 | A1* | 4/2015 | Choy ................. G06Q 30/0635 705/26.81 |
| 2015/0142594 | A1* | 5/2015 | Lutnick ............... G06Q 20/202 705/26.81 |
| 2015/0154559 | A1* | 6/2015 | Barbush .......... G06Q 10/08355 705/338 |
| 2015/0161564 | A1* | 6/2015 | Sweeney .......... G06Q 10/08355 705/338 |
| 2015/0178678 | A1 | 6/2015 | Carr et al. |
| 2015/0178712 | A1* | 6/2015 | Angrish ................ G06Q 20/20 705/5 |
| 2015/0186869 | A1* | 7/2015 | Winters .................. G06Q 10/08 705/26.81 |
| 2015/0193779 | A1* | 7/2015 | Lima .................... G06Q 30/018 705/317 |
| 2015/0227890 | A1 | 8/2015 | Bednarek et al. |
| 2015/0235304 | A1* | 8/2015 | Vincent .............. G06Q 30/0641 705/26.8 |
| 2015/0262121 | A1* | 9/2015 | Riel-Dalpe ............ G06Q 50/12 705/15 |
| 2015/0324741 | A1 | 11/2015 | Parry et al. |
| 2016/0071056 | A1* | 3/2016 | Ellison ............ G06Q 10/08355 705/338 |
| 2016/0109251 | A1 | 4/2016 | Thakur |
| 2016/0148300 | A1* | 5/2016 | Carr .................... G06Q 30/0633 705/26.8 |
| 2016/0171439 | A1 | 6/2016 | Ladden et al. |
| 2016/0171574 | A1 | 6/2016 | Paulucci et al. |
| 2016/0180287 | A1* | 6/2016 | Chan .................. G06Q 30/0255 705/333 |
| 2016/0210591 | A1* | 7/2016 | Lafrance ............... G06Q 10/047 |
| 2016/0232721 | A1 | 8/2016 | Singh et al. |
| 2016/0238406 | A1 | 8/2016 | Burtner et al. |
| 2016/0247113 | A1 | 8/2016 | Rademaker |
| 2016/0257401 | A1* | 9/2016 | Buchmueller ........ G01C 21/343 |
| 2016/0290811 | A1 | 10/2016 | Watterson et al. |
| 2016/0334797 | A1* | 11/2016 | Ross ..................... G08G 1/202 |
| 2016/0343062 | A1 | 11/2016 | Morton et al. |
| 2016/0350756 | A1 | 12/2016 | Shepard et al. |
| 2016/0379167 | A1* | 12/2016 | Raman ............... G06Q 10/1097 705/338 |
| 2016/0379202 | A1* | 12/2016 | Turner ................. G06Q 20/321 705/39 |
| 2017/0011340 | A1* | 1/2017 | Gabbai ............... G06Q 10/0836 |
| 2017/0024621 | A1 | 1/2017 | Thompson et al. |
| 2017/0025012 | A1 | 1/2017 | Thompson et al. |
| 2017/0039540 | A1* | 2/2017 | Bell ....................... G06Q 30/02 |
| 2017/0078504 | A1* | 3/2017 | Nagata .................... G09G 5/14 |
| 2017/0103490 | A1* | 4/2017 | Haparnas ............... H04W 4/023 |
| 2017/0116562 | A1* | 4/2017 | Schroeder ............ G06Q 10/083 |
| 2017/0124511 | A1* | 5/2017 | Mueller ................ H04W 4/029 |
| 2017/0154347 | A1 | 6/2017 | Bateman |
| 2017/0236088 | A1* | 8/2017 | Rao ................. G06Q 10/063112 705/7.17 |
| 2017/0287086 | A1 | 10/2017 | Lopez et al. |
| 2017/0356752 | A1 | 12/2017 | Lobo et al. |
| 2017/0357617 | A1* | 12/2017 | Ekanayake .............. G09G 5/005 |
| 2018/0012151 | A1* | 1/2018 | Wang ..................... G06Q 10/08 |
| 2018/0025318 | A1* | 1/2018 | Baggott ................ G06Q 10/047 705/334 |
| 2018/0039936 | A1 | 2/2018 | Klechner et al. |
| 2018/0068374 | A1* | 3/2018 | Turlay ...................... G06Q 20/18 |
| 2018/0081374 | A1 | 3/2018 | Nimchuk et al. |
| 2018/0089660 | A1* | 3/2018 | Elliott .................. G06Q 20/383 |
| 2018/0095604 | A1* | 4/2018 | Nguyen ................ G06F 40/186 |
| 2018/0158090 | A1 | 6/2018 | Glynn et al. |
| 2018/0165630 | A1* | 6/2018 | Gifford ............ G06Q 10/063112 |
| 2018/0174093 | A1* | 6/2018 | Perez .................... G06Q 10/083 |

(56) References Cited

U.S. PATENT DOCUMENTS

| | | | |
|---|---|---|---|
| 2018/0174101 A1* | 6/2018 | Mattingly | G06Q 10/08355 |
| 2018/0190001 A1 | 7/2018 | Napier et al. | |
| 2018/0240181 A1* | 8/2018 | Lopez | G06Q 10/00 |
| 2018/0247261 A1* | 8/2018 | Smith | G06Q 10/0833 |
| 2018/0268462 A1 | 9/2018 | Brown et al. | |
| 2018/0276602 A1* | 9/2018 | Rivalto | G06Q 20/308 |
| 2018/0356823 A1* | 12/2018 | Cooper | G05D 1/0202 |
| 2018/0365637 A1 | 12/2018 | Smith et al. | |
| 2018/0365638 A1 | 12/2018 | Chen et al. | |
| 2018/0365644 A1* | 12/2018 | Smith | G06Q 10/0837 |
| 2018/0365725 A1* | 12/2018 | Smith | G06Q 30/0639 |
| 2019/0019244 A1 | 1/2019 | Bangash | |
| 2019/0051174 A1* | 2/2019 | Haque | G08G 1/202 |
| 2019/0066516 A1* | 2/2019 | Kuhara | G05D 1/0016 |
| 2019/0080275 A1* | 3/2019 | Brownell | G06Q 50/01 |
| 2019/0087778 A1* | 3/2019 | Evans, Jr. | G06Q 30/0283 |
| 2019/0114666 A1* | 4/2019 | Kohli | G06Q 10/083 |
| 2019/0121522 A1* | 4/2019 | Davis | G06V 40/28 |
| 2019/0130086 A1* | 5/2019 | Tovey | G07C 9/00896 |
| 2019/0138983 A1* | 5/2019 | Endo | G07F 17/12 |
| 2019/0156358 A1 | 5/2019 | Pace | |
| 2019/0160994 A1* | 5/2019 | Letson | F25D 11/003 |
| 2019/0164118 A1* | 5/2019 | Sandberg | G06F 16/27 |
| 2019/0164144 A1* | 5/2019 | Hebert | G06Q 30/0635 |
| 2019/0166009 A1* | 5/2019 | Parvin | H04L 41/0803 |
| 2019/0205857 A1* | 7/2019 | Bell | G06Q 10/08 |
| 2019/0244448 A1* | 8/2019 | Alamin | G07C 9/00896 |
| 2019/0251504 A1* | 8/2019 | Spillman | G06Q 20/10 |
| 2019/0251621 A1* | 8/2019 | Harmon | G06Q 20/12 |
| 2019/0255573 A1* | 8/2019 | Chen | G06Q 10/08355 |
| 2019/0287063 A1* | 9/2019 | Skaaksrud | G05D 1/692 |
| 2019/0297467 A1* | 9/2019 | Vengroff | H04W 8/186 |
| 2019/0378080 A1* | 12/2019 | Srinivasan | G06Q 20/208 |
| 2019/0378081 A1* | 12/2019 | Swartz | G06Q 10/083 |
| 2020/0082459 A1* | 3/2020 | Varma | G06Q 20/102 |
| 2020/0151631 A1* | 5/2020 | Lamers | G08G 1/202 |
| 2020/0151660 A1* | 5/2020 | Warr | G06Q 10/06311 |
| 2020/0160428 A1* | 5/2020 | Calvo | G06Q 30/0633 |
| 2020/0250721 A1* | 8/2020 | Dana | G06F 21/6254 |
| 2020/0273431 A1* | 8/2020 | Dong | G09G 5/37 |
| 2021/0064824 A1 | 3/2021 | Ranatunga | |
| 2021/0089995 A1* | 3/2021 | Iacono | G06Q 10/083 |
| 2021/0090017 A1 | 3/2021 | Reiss et al. | |
| 2021/0097590 A1* | 4/2021 | Canseco | G06Q 30/0613 |
| 2021/0133724 A1* | 5/2021 | Harris | G06Q 20/3276 |
| 2021/0142391 A1* | 5/2021 | van Horne | G06F 3/04842 |
| 2021/0255985 A1* | 8/2021 | Schneider | G06Q 20/204 |
| 2021/0365885 A1* | 11/2021 | Timonen | G06Q 10/0835 |
| 2022/0058613 A1* | 2/2022 | Maxwell | G06Q 20/12 |

FOREIGN PATENT DOCUMENTS

| | | | | |
|---|---|---|---|---|
| WO | WO-0175746 A2 * | 10/2001 | | G06Q 10/087 |
| WO | WO-0198869 A2 * | 12/2001 | | H04N 1/00209 |
| WO | WO-2005072328 A2 * | 8/2005 | | G06Q 10/00 |
| WO | WO-2012050579 A1 * | 4/2012 | | G06Q 10/067 |
| WO | WO-2015084688 A1 * | 6/2015 | | G06Q 10/087 |
| WO | WO-2017197468 A1 * | 11/2017 | | |
| WO | WO-2019198858 A1 * | 10/2019 | | G06Q 10/083 |
| WO | WO-2020054118 A1 * | 3/2020 | | G06Q 10/08345 |
| WO | WO-2020207418 A1 * | 10/2020 | | |
| WO | WO-2020240731 A1 * | 12/2020 | | |

OTHER PUBLICATIONS

21. The closest non-applied art is Joseph Pisani, "should you tip the Uber driver? Here's what to give them", published by Taiwan News on Jul. 28, 2016, all pages. (Year: 2016).*

Joseph Pisani, "Should you tip the Uber driver? Here's what to give them", published by AP News, on Jul. 27, 2016, p. 2 (Year: 2016).*

Jean-Francois Rouges, "Crowdsourcing delivery: New Interconnected business models to reinvent delivery", published by 1st international physical internet conference, in 2014, all pages (Year: 2014).*

Meyersohn, Nathaniel, "Kroger Launches Online Grocery Delivery Service," Published Aug. 1, 2018, Accessed from Aug. 2, 2018, CNN Money, https://money.cnn.com/2018/08/01/news/companies/kroger-ship-grocery-delivery/index.html (Year: 2018).

D. Kwak, R. Liu, D. Kim, B. Nath and L. Iftode, "Seeing is Believing: Sharing Real-Time Visual Traffic Information via Vehicular Clouds," in IEEE Access, vol. 4, pp. 3617-3631, 2016, doi: 10.1109/ACCESS.2016.2569585 (Year: 2016) Apr. 2016.

* cited by examiner

SYSTEM AND METHOD FOR DISPATCHING DRIVERS FOR DELIVERING GROCERY ORDERS AND FACILITATING DIGITAL TIPPING

TECHNICAL FIELD

This disclosure relates generally to dispatching drivers for delivering online grocery orders and providing features and user interfaces for electronically tipping the drivers.

BACKGROUND

With the prevalence of online shopping for years, online grocery shopping is increasing too. Some grocery stores provide online grocery shopping and deliver the purchased groceries to the customers. Drivers for delivering grocery orders, unlike drivers for pizza delivery, generally work with a delivery network and cannot accept cash pursuant to their agreement with the delivery network. Therefore, systems and methods for dispatching drivers for delivery grocery orders and facilitating tipping are desired.

BRIEF DESCRIPTION OF THE DRAWINGS

To facilitate further description of the embodiments, the following drawings are provided in which.

Figure 1:
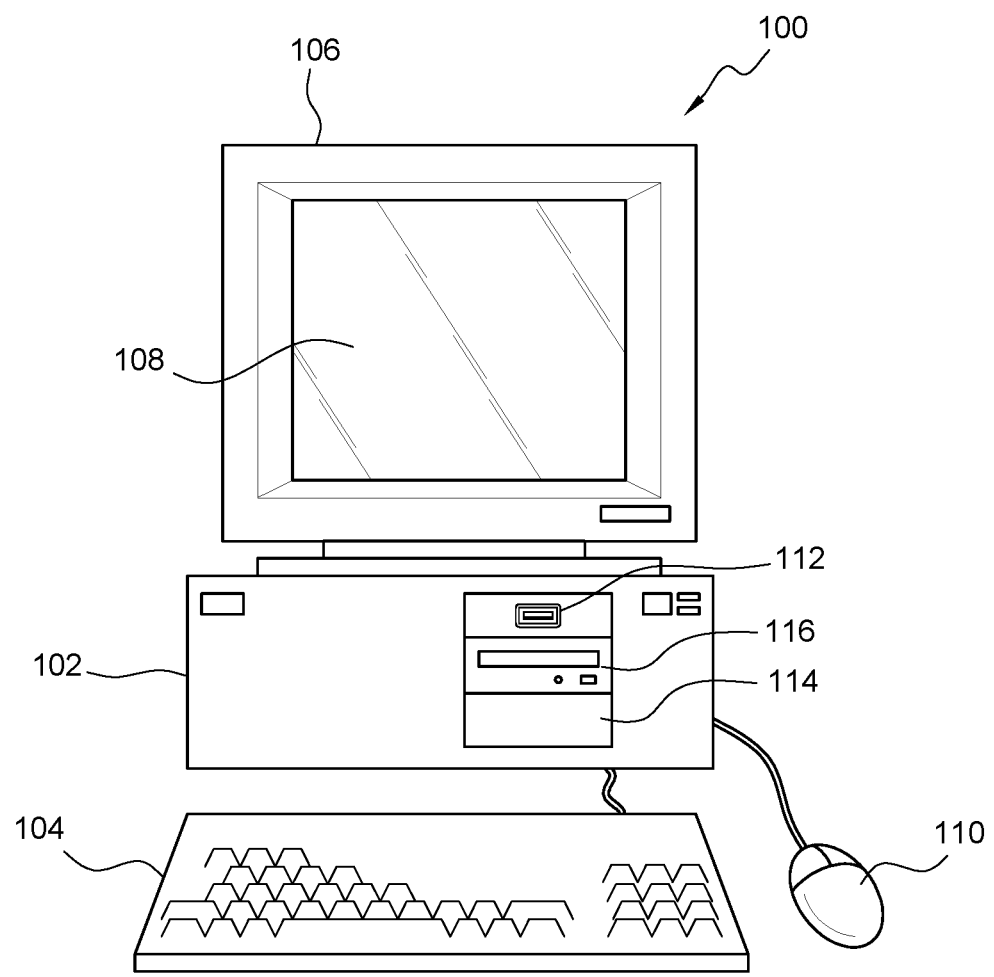
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, or fifteen minutes.

DESCRIPTION OF EXAMPLES OF EMBODIMENTS

Figure 2:
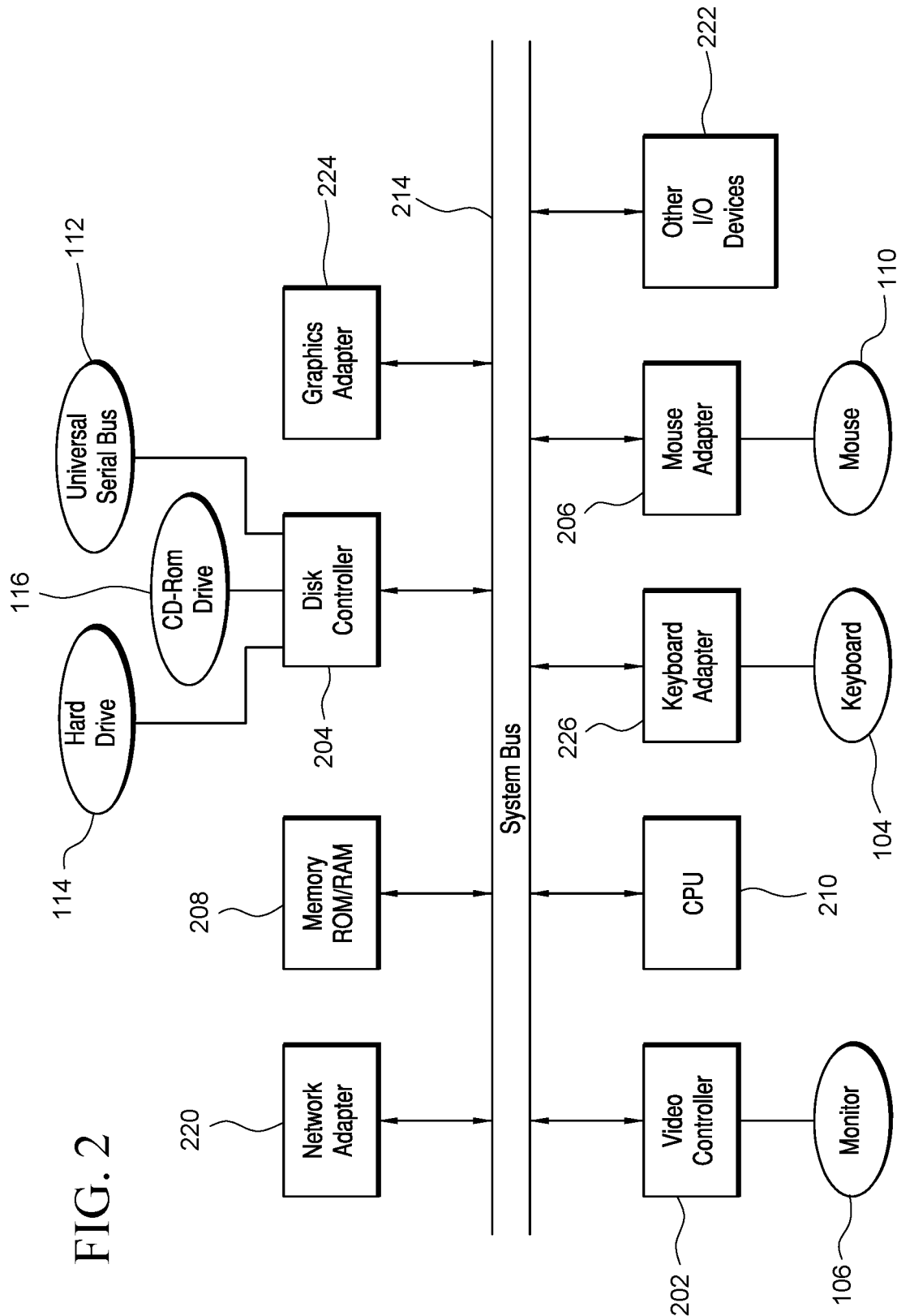
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refers to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
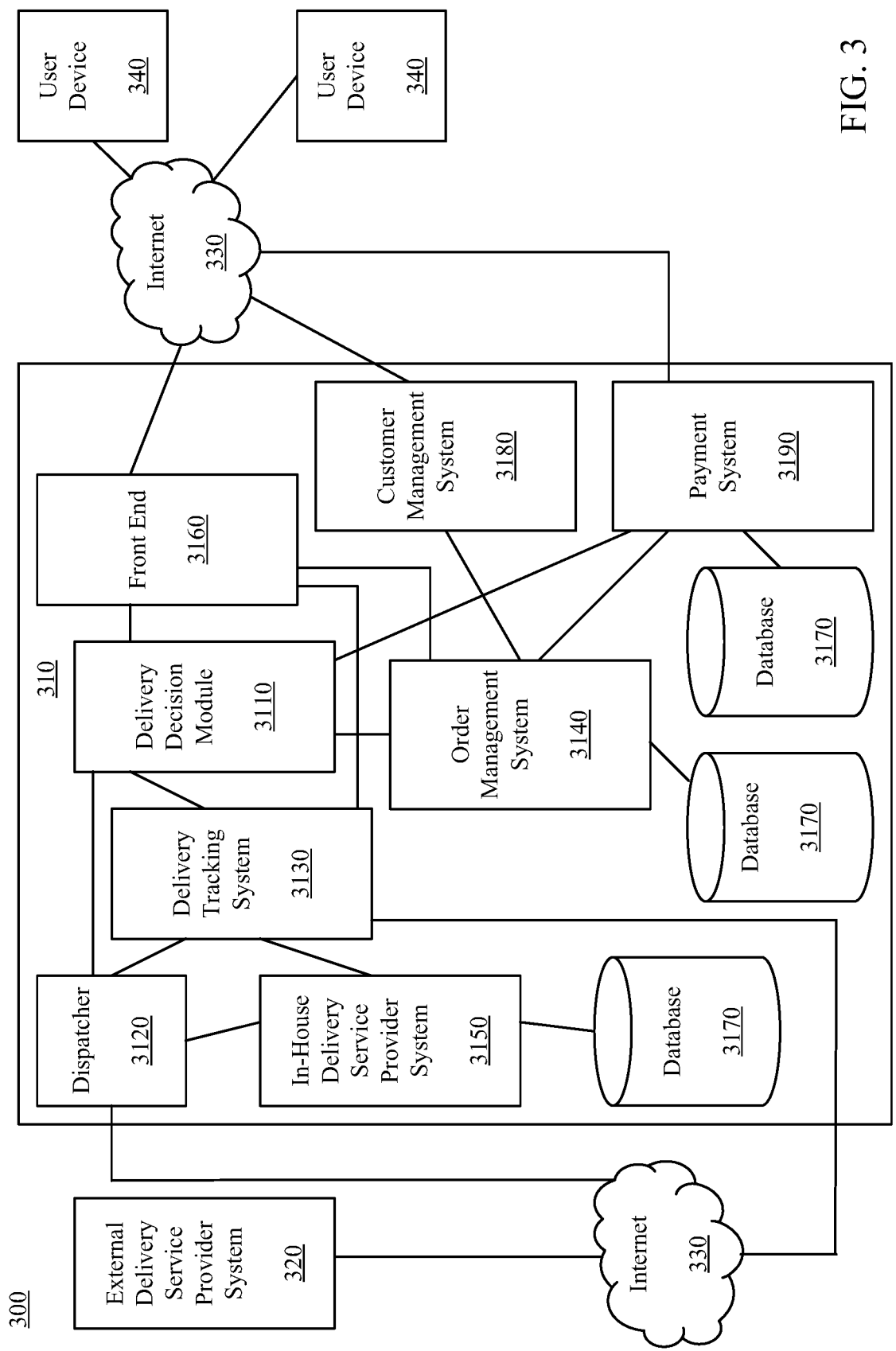
FIG. 3 illustrates a system for providing grocery delivery services and facilitating rewarding delivery drivers with gratuities for the services provided, according to an embodiment.

Turning ahead in the drawings, FIG. 3 illustrates a block diagram for a system 300, according to an embodiment. In many embodiments, system 300 comprises another system, such as system 310, an external delivery service provider system, such as external delivery service provider system 320, a computer network, such as Internet 330, and one or more user devices, such as user devices 340. In some embodiments, system 310 can be configured to dispatch a delivery driver to deliver a grocery order if the order is eligible for deliver and facilitate tipping the delivery driver if the delivery is eligible for tipping. Systems 300 and 310 are merely exemplary, and embodiments of systems 300 and 310 are not limited to the embodiments presented herein. Systems 300 and 310 can be employed in many different embodiments or examples not specifically depicted or described herein. In some embodiments, certain elements, modules, or systems of systems 300 and 310 can perform various procedures, processes, and/or activities. In other embodiments, the procedures, processes, and/or activities can be performed by other suitable elements, modules, or systems of systems 300 and 310. Systems 300 and 310 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of systems 300 and 310 described herein.

In this embodiment, system 310 can comprise delivery decision module 3110, dispatcher 3120, delivery tracking system 3130, order management system 3140, in-house delivery service provider system 3150, front end 3160, one or more databases 3170, customer management system 3180, and payment system 3190. In this embodiment, Internet 330 is coupled to external delivery service provider system 320, user devices 340, and system 310, at dispatcher 3120, delivery tracking system 3130, front end 3160, customer management system 3180, and payment system 3190. In this embodiment, one or more databases 3170 are coupled to order management system 3140, in-house delivery service provider system 3150, and payment system 3190.

In many embodiments, system 310 can be in data communication through Internet 330 with one or more external delivery service provider systems, such as external delivery service provider system 320, and/or one or more user computers, such as user devices 340. In some embodiments, user devices 340 can be used by users, which also can be referred to as customers. In some embodiments, system 310 can be in data communication with user devices 340 through front end 3160, and front end 3160 can include one or more websites hosted by a web server that hosts one or more other websites. In many embodiments, an internal network that is not open to the public can be used for communications among delivery decision module 3110, dispatcher 3120, delivery tracking system 3130, order management system 3140, in-house delivery service provider system 3150, front end 3160, one or more databases 3170, customer management system 3180, and payment system 3190. In these or other embodiments, an operator and/or administrator of system 310 can manage system 310, the processor(s) of system 310, and/or the memory storage unit(s) of system 310 using the input device(s) and/or display device(s) of system 310.

In many embodiments, order management system 3140 can further comprise one or more of: delivery decision module 3110, customer management system 3180, payment system 3190, and/or one or more databases 3170. In many embodiments, dispatcher 3120 also can comprise delivery tracking system 3130, in-house delivery service provider system 3150, and/or database 3170. System 310, delivery decision module 3110, dispatcher 3120, delivery tracking system 3130, order management system 3140, in-house delivery service provider system 3150, front end 3160, one or more databases 3170, customer management system 3180, and/or payment system 3190 can each be a computer system, such as computer system 100 (FIG. 1), as described above, and can each be a single computer, a single server, or a cluster or collection of computers or servers, or a cloud of computers or servers. In other embodiments, a single computer system can host systems 300 and/or 310.

In certain embodiments, user devices 340 can be implemented with desktop computers, laptop computers, a mobile device, and/or other endpoint devices used by one or more users, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can include the Virtual Retinal Display™ product, or similar product by the University of Washington of Seattle, Washington, United States of America. Meanwhile, in further specific examples, a limb mountable wearable user computer device can include the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300, system 310, delivery decision module 3110, dispatcher 3120, delivery tracking system 3130, order management system 3140, in-house delivery service provider system 3150, front end 3160, one or more databases 3170, customer management system 3180, and/or payment system 3190 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 300, system 310, delivery decision module 3110, dispatcher 3120, delivery tracking system 3130, order management system 3140, in-house delivery service provider system 3150, front end 3160, one or more databases 3170, customer management system 3180, and/or payment system 3190 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 300, system 310, delivery decision module 3110, dispatcher 3120, delivery tracking system 3130, order management system 3140, in-house delivery service provider system 3150, front end 3160, one or more databases 3170, customer management system 3180, and/or payment system 3190. In a similar manner, the processors and/or the non-transitory computer-readable media can be local and/or remote to each other.

Meanwhile, in many embodiments, system 300, system 310, delivery decision module 3110, dispatcher 3120, delivery tracking system 3130, order management system 3140, in-house delivery service provider system 3150, front end 3160, customer management system 3180, and/or payment system 3190 each also can be configured to communicate with and/or include one or more databases, such as databases 3170, and/or other suitable databases. The one or more databases can include an in-house delivery fleet management database that contains information about drivers, vehicles, shifts, delivery status, and so on. The one or more databases can further include an online grocery order database that contains information about orders received, payment status, pickup or delivery, customer information, items associated with the orders, and so on. The one or more databases also can include payment database that contains payment method, amount, associated orders, etc. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between system 300, system 310, delivery decision module 3110, dispatcher 3120, delivery tracking system 3130, order management system 3140, in-house delivery service provider system 3150, front end 3160, one or more databases 3170, customer management system 3180, payment system 3190, external delivery service provider system 320, and/or user devices 340 can be implemented using any suitable manner of wired and/or wireless communication. Accordingly, system 300, system 310, delivery decision module 3110, dispatcher 3120, delivery tracking system 3130, order management system 3140, in-house delivery service provider system 3150, front end 3160, one or more databases 3170, customer management system 3180, and/or payment system 3190 can each include any software and/or hardware components configured to implement the wired and/or wireless communication.

Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Figure 4:
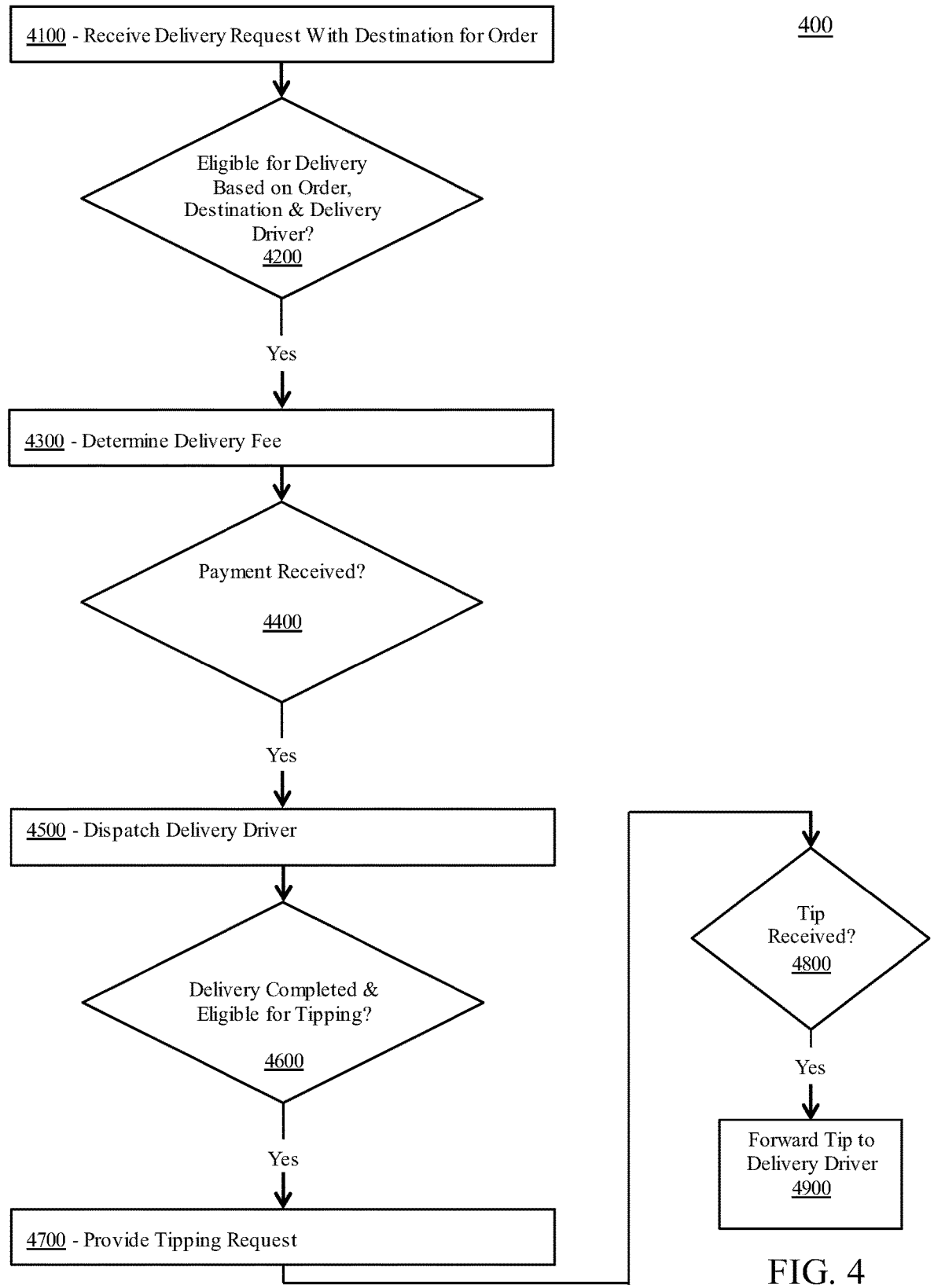
FIG. 4 illustrates a flow chart for a method for fulfilling a delivery request, providing a tipping option, and forwarding the tip paid to the delivery driver, according to another embodiment.
Figure 5:
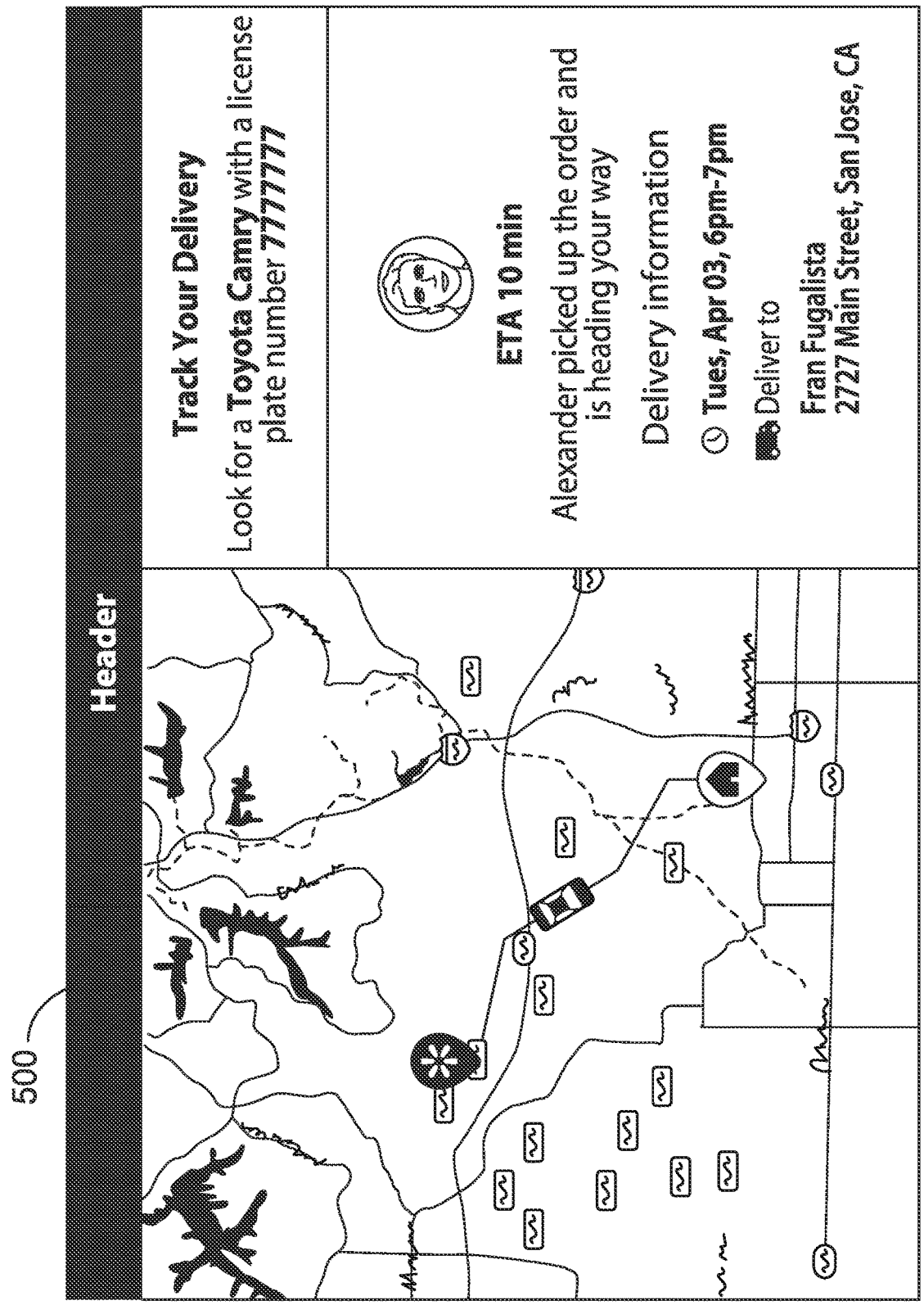
FIG. 5 illustrates an exemplary user interface for tracking a grocery delivery, according to another embodiment.
Figure 6:
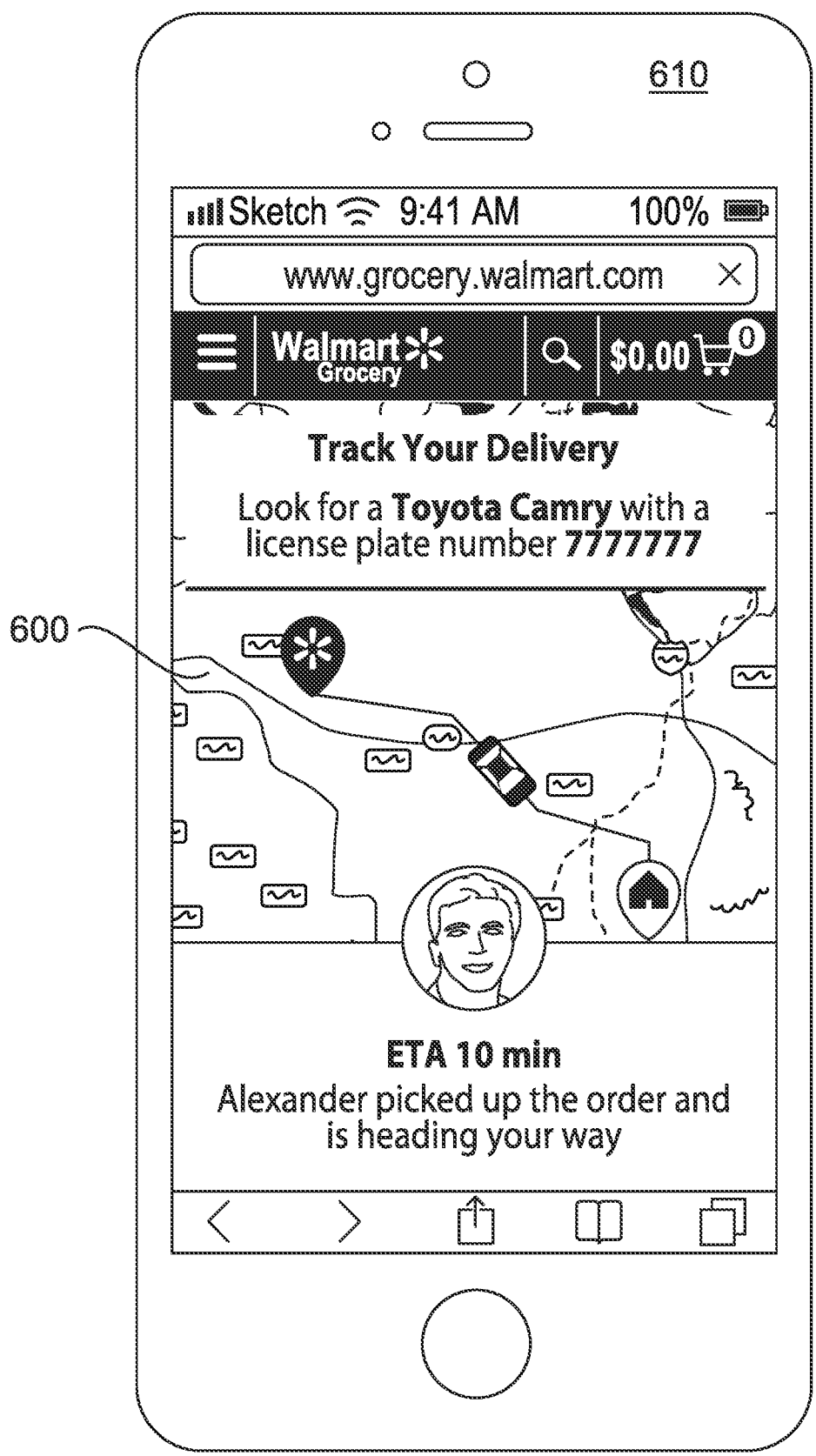
FIG. 6 illustrates another exemplary user interface for tracking the grocery delivery, according to the embodiment in FIG. 5.

Turning ahead in the drawings, FIG. 4 illustrates a flow chart for a method 400, according to an embodiment. In many embodiments, method 400 can be a method for arranging delivery if an order is eligible for delivery and facilitating tipping if the delivery is eligible for tipping. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, systems 300 and/or 310 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as system 310 (FIG. 3). The processor(s) can be similar or identical to the processor(s) described above with respect to computer system 100 (FIG. 1).

In many embodiments, method 400 can receive a delivery request from a user device for an online grocery order to a grocery store, the delivery request including a destination (block 4110); and determine whether the delivery request can be fulfilled based on the order, the destination, and the delivery driver available for delivery (block 4200). The user device can be similar or identical to user devices 340 (FIG. 3). In many embodiments, method 400 can provide one or more user interfaces configured to be rendered on the user device to receive the delivery request from a user. In some embodiments, the user interfaces can include a webpage on a website, such as front end 3160 (FIG. 3), adapted to be displayed on the user device (e.g., 340 (FIG. 3)), and/or an app installed and executed on the user device. In some embodiments, the user interfaces for receiving the delivery request are part of user interfaces for receiving the order and can comprise a set of control elements for various input options, including a choice of grocery store for the order, a requested delivery time, such as 12-6 pm today, 7-11 am tomorrow, or 2-day delivery, and so forth.

In many embodiments, method 400 can determine in block 4200 that the delivery request cannot be fulfilled based on the store policy of the grocery store. For example, in an embodiment, the reason for declining delivery in the store policy can include: when a total amount of the order is less than a minimum delivery amount; when a distance between the destination and the grocery store is more than a maximum delivery distance; and/or the destination is not inside any of one or more predetermined delivery areas.

In many embodiments, method 400 can determine in block 4200 that the order is not eligible for delivery because no driver for delivery is available based on the delivery request. In some embodiments, method 400 can select the delivery driver from a plurality of sources, such as one or more associate drivers of the grocery store, one or more contractor drivers of the grocery store, and/or third-party drivers selected from one or more third-party driver delivery networks, according to one or more driver selection rules of the store policy of the grocery store. In some embodiments, the one or more driver selection rules of the store policy of the grocery store can be that a third-party driver from the one or more third-party driver delivery networks based on a set of criteria has priority over any contractor driver of the grocery store, and that a contractor driver of the grocery store has priority over any associate drivers of the grocery store, when they are all available. In other embodiments, the one or more driver selection rules of the store policy can give different priorities to the candidate drivers than those in the previous embodiments or group the candidate drivers differently by having more than 3 groups of drivers, such as the third-party drivers in one third-party driver delivery network are preferred over the drivers in another third-party driver delivery network. In yet other embodiments, method 400 can provide a user interface and leave the choice of the delivery driver to the user, with the user interface displaying requirements corresponding to each of the options, such as the prices and/or earliest availability of the drivers.

In many embodiments, the set of criteria for selecting a third-party driver from the one or more third-party driver delivery networks can comprise one or more of: an arrival time at the grocery store of the third-party driver matches a projected fulfillment time of the order at the grocery store, as determined from estimates provided by each of one or more drivers from each of the one or more third-party driver delivery networks; an arrival time at the destination of the third-party driver matches a requested delivery time of the delivery request, as determined from estimates by the each of the one or more drivers from the each of the one or more third-party driver delivery networks; a quote of the third-party driver is lowest among one or more quotes of the one or more drivers from each of the one or more third-party driver delivery networks; and/or a customer review score of the third-party driver is at least as high as a minimum acceptable score, as determined from customer review scores of the one or more drivers from the each of the one or more third-party driver delivery networks.

In other embodiments, method 400 can determine that delivery is not possible when a status of the grocery store indicates that the grocery store opts out of delivery service, may be temporarily for other reasons, such as when the grocery store is in the midst of renegotiating contracts with, or searching for substitute for, one or more third-party driver delivery networks, when all drivers in the geographic area of the grocery store are going on strike, or when a natural disaster hits the grocery store. In some embodiments, method 400 can determined that delivery of this order is not available in this grocery store but the order can be fulfilled and delivered in another grocery store, and method 400 can be configured to switch the order to the another grocery store automatically or prompt the user to decide.

In many embodiments, when the order is eligible for delivery, method 400 also can determine a delivery fee (block 4300) based on one or more delivery fee rules of the store policy. In some embodiments, the one or more delivery fee rules can comprise: the delivery fee is a fixed delivery fee based on the order and the destination, according to the store policy, such as $5 for all orders eligible for delivery, or $5 for delivery-eligible orders associated with destination within 10 miles radius of the grocery store, $7 when the destination is within 15 miles radius, and $10 when the destination is within 25 miles, for example. In other embodiments, the one or more delivery fee rules can comprise: when the delivery driver is the associate driver, the delivery is free; and when the delivery driver is not the associate driver, the delivery fee is one of a fixed delivery fee based on the order or a quote by the delivery driver, according to the store policy. In an embodiment, method 400 can be configured to receive the quote from a contractor/third-party driver of the grocery store by providing a user interface for the contractor, the third-party driver, or a supervisor of the third-party driver to enter the quote. In another embodiment, method 400 can communicate with a system of one of the one or more third-party driver delivery networks, such as external delivery service provider system 320 (FIG. 3), and obtain the quote for the third-party drivers of the one of the one or more third-party driver delivery networks based on grocery store and the destination. In many embodiments, once the delivery fee is determined, method 400 also can direct the user to a payment system, such as payment system 3190 (FIG. 3), or a front end, such as front end 3160 (FIG. 3) for the payment system, to make the payment.

In many embodiments, when a payment including the delivery fee is confirmed (block 4400), method 400 can dispatch the delivery driver to deliver the order (block 4500). In many embodiments, method 400 can determine that the payment is received by confirming with a payment system, such as payment system 3190 (FIG. 3), or receiving a notification from the payment system about the payment. In some embodiments, when the delivery driver is an in-house delivery driver, such as an associate or a contractor driver, of the grocery store, method 400 can dispatch the delivery driver by notifying the delivery driver to pick up the ordered items at a projected fulfillment time of the order at the grocery store and deliver the order to the destination; and requesting delivery status updates from the delivery driver. In many embodiments, method 400 can dispatch the in-house delivery drivers through an in-house delivery system, such as in-house delivery service provider system 3150 (FIG. 3), that assigns a vehicle to the delivery driver, records the statuses of the driver and the vehicle in an in-house delivery fleet management database, such as database 3170 (FIG. 3), and updates a delivery status to method 400.

In many embodiments, when the delivery driver is the third-party driver from a selected third-party driver delivery network of the one or more third-party driver delivery networks, method 400 can dispatch the third-party driver (block 4500) by providing a dispatching request to the selected third-party driver delivery network, the dispatching request comprising the grocery store, a projected fulfillment time of the order at the grocery store, and the destination; and receiving a delivery status from the selected third-party driver delivery network. In many embodiments, the delivery status provided by the delivery drivers, the in-house delivery system, and/or the selected third-party driver delivery network can include a pickup of the order, a confirmation of delivery, and/or a real-time tracking of the delivery driver, or the vehicle of the delivery driver, by self-reporting or a tracking device such as GPS devices or any suitable trackers. In many embodiments where the delivery driver, or the selected third-party driver delivery network of the third-party driver, provides the delivery status, such as real-time tracking of the delivery driver or the vehicle of the delivery driver, method 400 can forward the delivery status to the user according to a tracking request from the user. Examples of the tracking request in such embodiments can include the user's access to a user interface, such as webpages or apps, configured to provide the delivery status; and/or the user's signing up for push notifications, including emails, SMS text messages, or in-app notices, of major events of the delivery, such as the dispatching of the delivery driver, store pickup, and/or the completion of the delivery.

In many embodiments, method 400 can determine whether the delivery is completed and whether the completed delivery is eligible for tipping (block 4600) by checking the delivery status of the delivery, as in the aforementioned embodiments, and applying one or more delivery fee rules of the grocery store for the tipping eligibility for the delivery driver. In some embodiments, the one or more delivery rules can comprise one of: when the order is eligible for delivery, the tipping eligibility is always positive, otherwise, the tipping eligibility is negative; when the order is eligible for delivery and when the delivery driver is not the associate driver, the tipping eligibility is positive, otherwise, the tipping eligibility is negative; when the order is eligible for delivery and when the expected delivery time is within a week before holidays, the tipping eligibility is positive; or when the order is eligible for delivery and when the delivery driver is the third-party driver, the tipping eligibility is positive.

Figure 9:
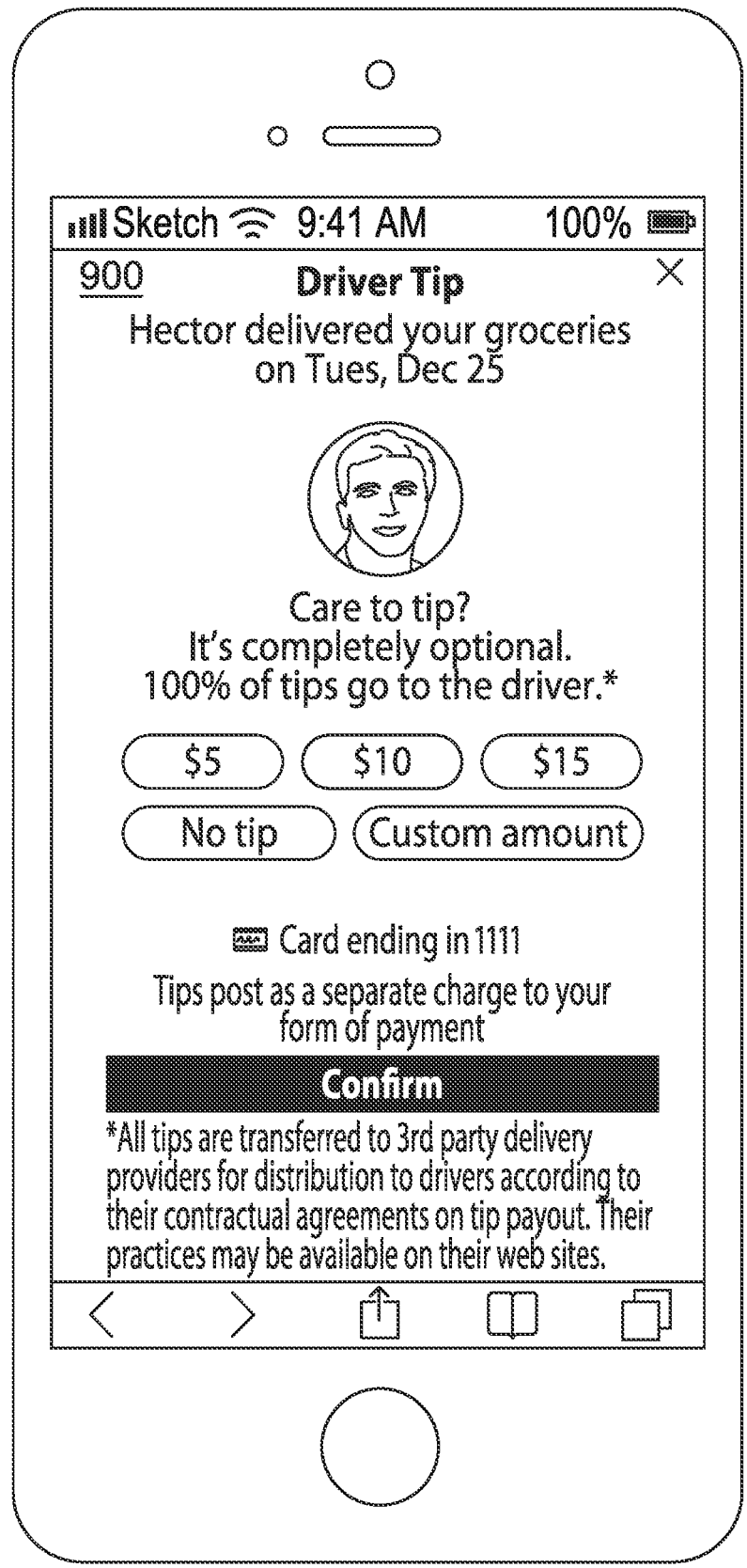
FIG. 9 illustrates a user interface for tipping a delivery driver, according to another embodiment.

In many embodiments, method 400 can provide a tipping request to the user (block 4700) by providing a user interface, such as a webpage, for the user to access and send a tip or sending a push notification, such as an email, an in-app notice, or a SMS message, to the user, inviting a tip to the delivery driver. In some embodiments, the user interface can be similar or identical to user interface 900, as shown in FIG. 9 and described below. In many embodiments, the tipping request also can comprise a link to a payment system, such as payment system 3190 (FIG. 3), the link comprising information about the fulfilled delivery request, the order, and/or the delivery driver, and a proposed tip including one of: one or more suggested tipping amount, such as $5, $10, or $15; one or more suggested percentages based on the amount of the order, such as 15% or 20%; or one or more suggested percentages based on the amount of the delivery fee. In many embodiments where the tipping request is sent by push notifications, method 400 can resend the tipping request, at a predetermined frequency, such as every other day or once every week, until the tip is received or after a certain period of time. In some embodiments, method 400 can comprise an expiration time period for the tipping request, determined according to the store policy, and revoke the tipping request after the expiration time period, from the date and/or time the tipping request is created or the date and/or time of the delivery.

In some embodiments, method 400 can provided the tipping request with, or after, a review request. In some embodiments, method 400 can determine that the delivery is no longer eligible for tipping when the review result for the delivery from the user fails to meet one or more predetermined customer satisfaction criteria. For example, when the review result of the delivery is a thumb-down, when the review result is a 1 out of 5 stars, or when the review result is determined by a natural language processor to be negative, method 400 in this embodiment can either revoke the tipping request, such as by disabling the link to the payment system in the tipping request, if the tipping request has been provided and accessed, or not send out, or discontinue, any tipping request if the tipping request is not yet provided when the review result is received.

In many embodiments, method 400 can continue by determining that a tip is received for the delivery (block 4800) and then forwarding the tip to the delivery driver who performed the delivery (block 4900). In many embodiments, when a tip is submitted following the link to the payment system in the tipping request or sent with information identifying the delivery, such as an identification of the order or the delivery request, method 400 can determine the delivery driver for such delivery and forward the tip to the delivery driver. In many embodiments, when the delivery is eligible for tipping and the delivery driver is an in-house delivery driver, method 400 can forward the tip to the delivery driver according to the store policy, such as 100% of the tip to the delivery driver, 80% of the tip to the delivery driver and 20% to the delivery department of the grocery store, or 75% of the tip to the delivery driver, 20% to the delivery department, and 5% to the order fulfilment department. In many embodiments, when the delivery driver is the third-party driver from the selected third-party driver delivery network of the one or more third-party driver delivery networks, method 400 can forward the tip to the delivery driver through a system of the selected third-party driver delivery network, such as external delivery service provider system 320 (FIG. 3). In some embodiments, method 400 can forward the tip to the third-party delivery driver at a certain time or after a certain time period, such as at the $5^{th}$ day of every month or after 10 days from the date the tip is received.

Figure 7:
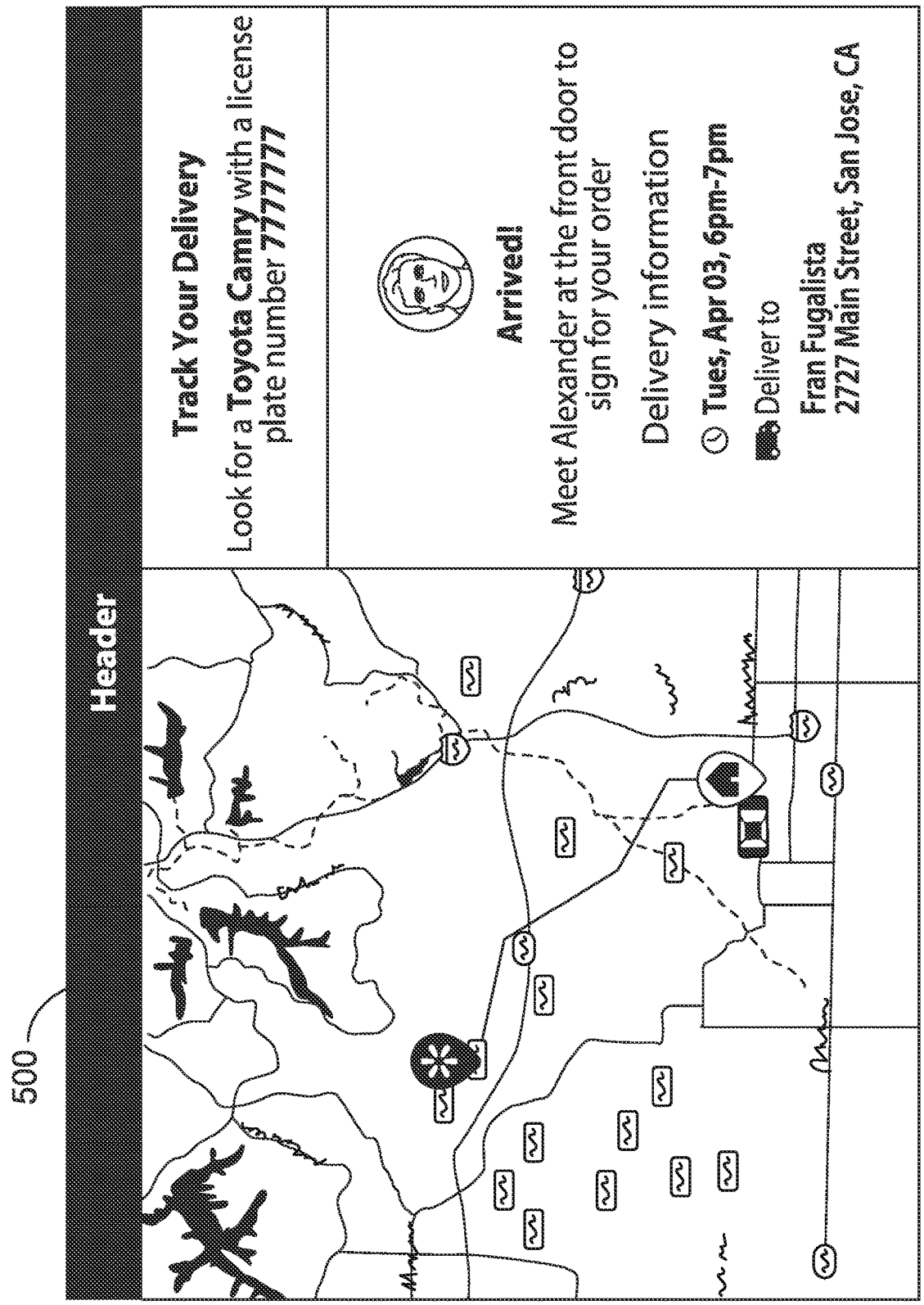
FIG. 7 illustrates the exemplary user interface for tracking the grocery delivery, after the grocery delivery is completed, according to the embodiment in FIG. 5.
Figure 8:
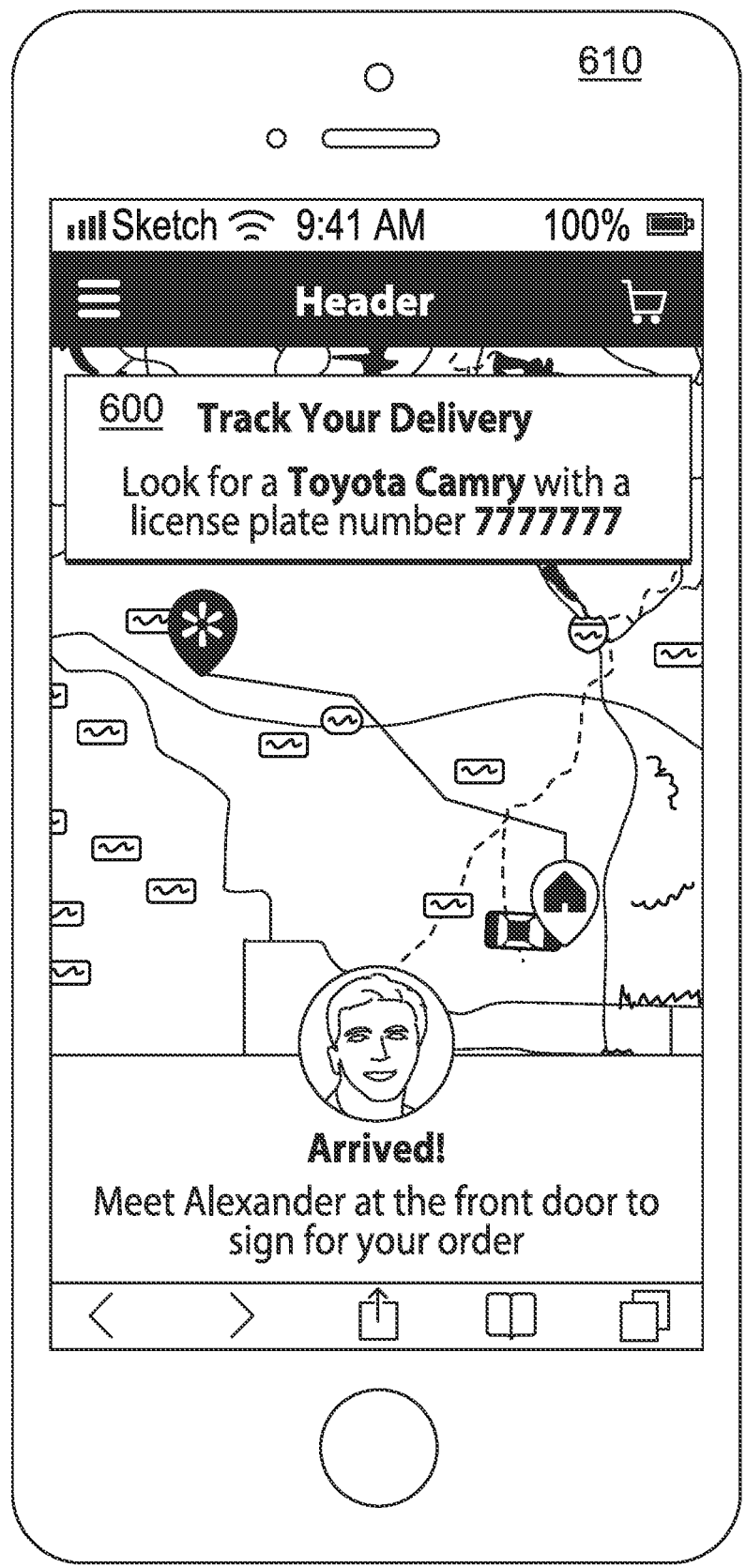
FIG. 8 illustrates the another exemplary user interface for tracking the grocery delivery, after the grocery delivery is completed, according to the embodiment in FIG. 5.

Turning ahead in the drawings, FIGS. 5-8 illustrate user interfaces 500 and 600 for tracking a grocery delivery, according to another embodiment. In many embodiments, multiple types of user interfaces, such as user interfaces 500 and 600, can be provided to adapt to various types of user devices. For example, in this embodiment shown in FIG. 5, user interface 500 can be designed to be rendered on a user device with a relatively large screen, such as a personal computer, a laptop, or a tablet, and comprise a webpage or an app configured to show the real-time tracking status of the delivery, including the information of the delivery driver, the vehicle, the recipient, the destination, the route of the delivery, the estimated time of arrival at the destination, and so forth. User interface 600, in this embodiment shown in FIG. 6, can be designed to be rendered on a user device, such as user device 610, with a relatively small screen, such as a cell phone, and also comprise a webpage or an app configured to show the tracking information about the delivery, such as the delivery driver, the vehicle, the route of the delivery, the estimated time of arrival at the destination, and so on. As shown in FIGS. 7 and 8, user interfaces 500 and 600, respectfully, in these embodiments, are configured to show the updated real-time tracking status of the delivery that the delivery has arrived and is thus completed.

Turning ahead in the drawings, FIG. 9 illustrates user interface 900 for tipping a delivery driver, according to another embodiment. In many embodiments, the one or more user interfaces, such as user interface 900, for displaying a tipping request can comprise one or more buttons corresponding to predetermined options or suggestions for the tip, including "no tip," "$5," "$10," or "15." In some embodiments, the one or more user interfaces, such as user interface 900, for displaying a tipping request also can comprise a "Custom Amount" option that brings up another GUI control element or a separate user interface to receive an amount for the tip. In other embodiments, the one or more user interfaces for displaying a tipping request can comprise one or more buttons corresponding to predetermined options or suggestions for the tip, including "no tip," "10%," "15%," "20%," "25%," and/or a "Custom Percentage." In many embodiments, the user interface(s) for displaying a tipping request, such as user interface 900, can show the information about the payment method used for paying the order and/or the delivery fee and allow only the same payment method for tipping. In other embodiments, the payment method for tipping can be different from that for the order/delivery.

User interfaces 500, 600, and 900 in FIGS. 5-9 are merely exemplary and are not limited to the embodiments presented herein. User interfaces 500, 600, and 900 can be employed in many different embodiments or examples not specifically depicted or described herein. In other embodiments, the designs, the elements, and/or arrangements of the elements can be replaced by other suitable designs, elements, and/or arrangements of the elements of user interfaces 500, 600, and/or 900. In many embodiments, system 310 (FIG. 3), front end 3160 (FIG. 3), and/or method 400 (FIG. 4) can be suitable to adopt user interface 500, user interface 600, user interface 900, and/or one or more of the designs, elements, or arrangements of the elements of user interface 500, 600, and/or 900.

In an embodiment, a system can comprise one or more processors; and one or more non-transitory computer-readable media storing computing instructions. In this embodiment, the computing instructions can be configured to run on the one more processors and perform a method for dispatching a delivery driver and allowing the user to electronically tip the delivery driver. The method in this embodiment can comprise: receiving a delivery request from a user, the delivery request comprising a destination and being associated with an order to a grocery store; and determining whether the order is eligible for delivery, based on the order, the destination, and a delivery driver selected among multiple delivery service providers. In this embodiment, the delivery driver can be selected, by the system, according to one or more driver selection rules of a store policy of the grocery store. The multiple delivery service providers can be the grocery store with one or more in-house delivery drivers and one or more third-party driver delivery networks.

When the order is eligible for delivery, the method in this embodiment also can comprise: determining a delivery fee for the order based on one or more delivery fee rules of the store policy. According to the one or more delivery fee rules, the delivery fee for the order in this embodiment can be a flat fee based on the order and the store policy or determined by the delivery driver when the delivery driver is from the one or more third-party driver delivery networks. In this embodiment, after the payment of the fees associated with the order and the delivery of the order to the destination is received, the method can further comprise dispatching the delivery driver to deliver the order to the destination. In this embodiment, the method can be configured to provide the user tracking information of the delivery of the order to the destination, upon request by the user or by actively pushing the tracking information to the user's device until the delivery is completed, based on the user's setting.

In this embodiment, the method also can comprise: confirming that the delivery of the order to the destination is completed; and determining whether the completed delivery is eligible for tipping based on the one or more delivery fee rules. In this embodiment, the one or more delivery fee rules can allow tipping only for contractor drivers of the grocery store or third-party drivers from the one or more third-party driver delivery networks. When the completed delivery is eligible for tipping, the method in this embodiment can further comprise: providing a tipping request to the user; and upon receipt of a confirmation of a tip, forwarding the tip to the delivery driver. In this embodiment, when the delivery driver is a third-party driver, the method can forward the tip to the delivery driver through the third-party driver delivery network of the third-party driver. In this embodiment, the system also can provide one or more user interfaces, such as a user interface for the user to request delivery of an online order, another user interface for tracking the delivery, and/or yet another user interface for tipping the delivery driver, when the user receives a tipping request from the system.

In another embodiment, a method for selecting a delivery driver to dispatch among multiple delivery service providers and allowing the user to electronically tip the delivery driver can be implemented via execution of computing instructions configured to run at one or more processors and stored at one or more non-transitory computer-readable media. In this embodiment, the method can comprise one or more of the activities in the previous embodiment, including receiving a delivery request from a user, the delivery request comprising a destination and being associated with an order to a grocery store; determining a delivery eligibility for the order, based on the order, the destination, and a delivery driver selected according to one or more driver selection rules of a store policy of the grocery store, from a single one of an associate driver of the grocery store, a contractor driver of the grocery store, or a third-party driver selected from one or more third-party driver delivery networks; and when the delivery eligibility for the order is positive: determining a delivery fee for the order based on the one or more delivery fees rules of the store policy; and/or upon receipt of a confirmation of a payment for the order including the delivery fee, dispatching the delivery driver to deliver the order to the destination.

In this embodiment, when a delivery is confirmed, the method also can determine a tipping eligibility for the delivery driver based on the one or more delivery fees rules. If the tipping eligibility for the delivery driver is positive, the method of this embodiment can comprise providing a tipping request to the user. In this embodiment, the method can be configured to forward a tip to the delivery driver after the tip for the delivery is received.

In many embodiments, the techniques described herein can advantageously provide a consistent user experience by providing an integrated user interfaces for a customer to tip a delivery driver regardless of which driver delivery network was used to deliver the order, as long as the delivery driver is eligible to receive a tip.

In many embodiments, the techniques described herein can be used continuously at a scale that cannot be handled using manual techniques. For example, the number of delivery drivers in the system, including associate drivers of the grocery store, contractor drivers of the grocery store, and third-party drivers selected from one or more third-party driver delivery networks, can exceed many thousands.

In a number of embodiments, the techniques described herein can solve a technical problem that arises only within the realm of computer networks, as online grocery orders and their deliveries do not exist outside the realm of computer networks. Moreover, the techniques described herein can solve a technical problem that cannot be solved outside the context of computer networks. Specifically, the techniques described herein cannot be used outside the context of computer networks, in view of the enormous amount of orders, deliveries, delivery driver information, and other data that must be received, transmitted, organized, updated, and managed.

Although systems and methods for dispatching a delivery driver for an online grocery order and facilitating digital tipping have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-9 may be modified, and that the foregoing discussion of certain of these embodiments does not necessarily represent a complete description of all possible embodiments. For example, one or more of the procedures, processes, or activities in the blocks of FIG. 4 may include different procedures, processes, activities, and/or blocks and may be performed by many different components in many different orders. As yet another example, the grocery store and grocery order can be replaced by a general retail store and a general retail order.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions configured to, when run on the one or more processors, cause the one or more processors to perform:
      receiving a delivery request from a user, the delivery request comprising a destination and being associated with an order to a grocery store;
      determining a delivery eligibility for the order, based on (1) the order, (2) the destination, and (3) a delivery driver selected, according to one or more driver selection rules of a store policy of the grocery store, from a single one of (a) an associate driver of the grocery store, (b) a contractor driver of the grocery store, or (c) a third-party driver selected from one or more third-party driver delivery networks, wherein the one or more driver selection rules comprise:
         when the third-party driver selected from the one or more third-party driver delivery networks based on a set of criteria is available, the delivery driver is the third-party driver;
         when the third-party driver is not available and the contractor driver is available, the delivery driver is the contractor driver; and
         when neither the third-party driver nor the contractor driver is available and when the associate driver is available, the delivery driver is the associate driver; and
      when the delivery eligibility for the order is positive:
         determining a delivery fee for the order based on one or more delivery fee rules of the store policy;
         upon receipt of a confirmation of a payment for the order, including the delivery fee, dispatching the delivery driver to deliver the order to the destination;
         receiving a real-time tracking of the delivery driver from a tracking device of a vehicle for the delivery driver, wherein, when the delivery driver is the third-party driver, the receiving occurs via a selected third-party driver delivery network of the one or more third-party driver delivery networks, based on the third-party driver, as dispatched;
         providing a first user interface featuring the real-time tracking to be displayed on a display device for the user according to a tracking request from the user, wherein:
            the first user interface comprises one or more user interface components selected and arranged for display according to a type of the display device for the user;
            the one or more user interface components comprise a map display component configured to display a visual representation of a current location of the delivery driver on a map for the real-time tracking;
            each of the one or more user interface components is configured to display respective information for the real-time tracking according to the type of the display device;
            providing the first user interface further comprises:
               determining a quantity of the one or more user interface components to be selected based on the type of the display device and the respective information for each of the one or more user interface components; and
               determining a geographic area for the map to be displayed on the map display component based on the type of the display device; and
            when the type of the display device is of a first type of screen, the quantity of the one or more user interface components and the geographic area for the map, as determined, are greater than when the type of the display device is of a second type of screen that is smaller than the first type of screen; and
         upon receipt of a confirmation of delivery of the order to the destination:
            determining a tipping eligibility for the delivery driver based on the one or more delivery fee rules; and
            when the tipping eligibility for the delivery driver is positive:
               providing a second user interface featuring a tipping request to be displayed on the display device for the user; and
               upon receipt from the user of a confirmation of a tip, transmitting the tip to the delivery driver.

2. The system of claim 1, wherein the delivery eligibility for the order is negative when at least one of:
   a total amount of the order is less than a minimum delivery amount based on the store policy;
   a distance between the destination and the grocery store is more than a maximum delivery distance based on the store policy;
   the destination is not inside any of one or more predetermined delivery areas according to the store policy; or
   the delivery driver is not available based on the delivery request.

3. The system of claim 1, wherein:
   the one or more driver selection rules further comprises different priorities for selecting third-party drivers from different third-party driver delivery networks of the one or more third-party driver delivery networks.

4. The system of claim 1, wherein the set of criteria comprises one or more of:
   an arrival time at the grocery store of the third-party driver matches a projected fulfillment time of the order at the grocery store, as determined from estimates by each of one or more third-party drivers from each of the one or more third-party driver delivery networks;
   an arrival time at the destination of the third-party driver matches a requested delivery time of the delivery request, as determined from the estimates by the each of the one or more third-party drivers from the each of the one or more third-party driver delivery networks;
   a quote of the third-party driver is lowest among one or more quotes of the each of the one or more third-party drivers from each of the one or more third-party driver delivery networks; or
   a customer review score of the third-party driver is at least as high as a minimum acceptable score, as determined from customer review scores of the each of the one or more third-party drivers from the each of the one or more third-party driver delivery networks.

5. The system of claim 1, wherein, when the delivery driver is the third-party driver, the dispatching the delivery driver to deliver the order further comprises:
   providing a dispatching request to the selected third-party driver delivery network of the one or more third-party driver delivery networks, the selected third-party driver delivery network being associated with the delivery driver, the dispatching request comprising the grocery store, a projected fulfillment time of the order at the grocery store, and the destination; and
   receiving a delivery status from the selected third-party driver delivery network.

6. The system of claim 5, wherein:
   the delivery status comprises the real-time tracking of the delivery driver.

7. The system of claim 1, wherein the one or more delivery fee rules comprise:
   when the delivery eligibility for the order is positive and when the delivery driver is not the associate driver:
      the tipping eligibility for the delivery driver is positive; and
      the delivery fee is one of a fixed delivery fee based on the order and the destination or a quote by the delivery driver, according to the store policy; and
   when the delivery eligibility for the order is negative or when the delivery driver is the associate driver, the tipping eligibility for the delivery driver is negative.

8. The system of claim 1, wherein the tipping request is revoked after an expiration time period determined according to the store policy.

9. The system of claim 1, wherein the computing instructions are further configured to cause the one or more processors to perform:
   providing a review request to be rendered on the second user interface for the display device; and
   receiving a review result from the user, in response to the review request.

10. The system of claim 1, wherein the tipping request comprises one or more proposed tips determined based on one of:
   one or more predetermined percentages of a total amount of the order; or
   one or more predetermined fixed amounts.

11. A method being implemented via execution of computing instructions configured to run at one or more processors and stored at one or more non-transitory computer-readable media, the method comprising:
   receiving a delivery request from a user, the delivery request comprising a destination and being associated with an order to a grocery store;
   determining a delivery eligibility for the order, based on (1) the order, (2) the destination, and (3) a delivery driver selected, according to one or more driver selection rules of a store policy of the grocery store, from a single one of (a) an associate driver of the grocery store, (b) a contractor driver of the grocery store, or (c) a third-party driver selected from one or more third-party driver delivery networks, wherein the one or more driver selection rules comprise:
      when the third-party driver selected from the one or more third-party driver delivery networks based on a set of criteria is available, the delivery driver is the third-party driver;
      when the third-party driver is not available and the contractor driver is available, the delivery driver is the contractor driver; and
      when neither the third-party driver nor the contractor driver is available and when the associate driver is available, the delivery driver is the associate driver; and
   when the delivery eligibility for the order is positive:
      determining a delivery fee for the order based on one or more delivery fee rules of the store policy;
      upon receipt of a confirmation of a payment for the order, including the delivery fee, dispatching the delivery driver to deliver the order to the destination;
      receiving a real-time tracking of the delivery driver from a tracking device of a vehicle for the delivery driver, wherein, when the delivery driver is the third-party driver, the receiving occurs via a selected third-party driver delivery network of the one or more third-party driver delivery networks, based on the third-party driver, as dispatched;
      providing a first user interface featuring the real-time tracking to be displayed on a display device for the user according to a tracking request from the user, wherein:
         the first user interface comprises one or more user interface components selected and arranged for display according to a type of the display device for the user;
         the one or more user interface components comprise a map display component configured to display a visual representation of a current location of the delivery driver on a map for the real-time tracking;
         each of the one or more user interface components is configured to display respective information for the real-time tracking according to the type of the display device;
         providing the first user interface further comprises:
            determining a quantity of the one or more user interface components to be selected based on the type of the display device and the respective information for each of the one or more user interface components; and
            determining a geographic area for the map to be displayed on the map display component based on the type of the display device; and
         when the type of the display device is of a first type of screen, the quantity of the one or more user interface components and the geographic area for the map, as determined, are greater than when the type of the display device is of a second type of screen that is smaller than the first type of screen; and upon receipt of a confirmation of delivery:
determining a tipping eligibility for the delivery driver based on the one or more delivery fee rules; and
when the tipping eligibility for the delivery driver is positive:
providing a second user interface featuring a tipping request to be displayed on the display device for the user; and
upon receipt from the user of a confirmation of a tip, transmitting the tip to the delivery driver.

12. The method of claim 11, wherein the delivery eligibility for the order is negative when at least one of:
a total amount of the order is less than a minimum delivery amount based on the store policy;
a distance between the destination and the grocery store is more than a maximum delivery distance based on the store policy;
the destination is not inside any of one or more predetermined delivery areas according to the store policy; or
the delivery driver is not available based on the delivery request.

13. The method of claim 11, wherein:
the one or more driver selection rules further comprises different priorities for selecting third-party drivers from different third-party driver delivery networks of the one or more third-party driver delivery networks.

14. The method of claim 11, wherein the set of criteria comprises one or more of:
an arrival time at the grocery store of the third-party driver matches a projected fulfillment time of the order at the grocery store, as determined from estimates by each of one or more third-party drivers from each of the one or more third-party driver delivery networks;
an arrival time at the destination of the third-party driver matches a requested delivery time of the delivery request, as determined from the estimates by the each of the one or more third-party drivers from the each of the one or more third-party driver delivery networks;
a quote of the third-party driver is lowest among one or more quotes of the each of the one or more third-party drivers from each of the one or more third-party driver delivery networks; or
a customer review score of the third-party driver is at least as high as a minimum acceptable score, as determined from customer review scores of the each of the one or more third-party drivers from the each of the one or more third-party driver delivery networks.

15. The method of claim 11, wherein when the delivery driver is the third-party driver, the dispatching the delivery driver to deliver the order further comprises:
providing a dispatching request to the selected third-party driver delivery network of the one or more third-party driver delivery networks, the selected third-party driver delivery network being associated with the delivery driver, the dispatching request comprising the grocery store, a projected fulfillment time of the order at the grocery store, and the destination; and
receiving a delivery status from the selected third-party driver delivery network.

16. The method of claim 15, wherein the delivery status comprises the real-time tracking of the delivery driver.

17. The method of claim 11, wherein the one or more delivery fee rules comprises:
when the delivery eligibility for the order is positive and when the delivery driver is not the associate driver:
the tipping eligibility for the delivery driver is positive; and
the delivery fee for the order is one of a fixed delivery fee based on the order and the destination or a quote by the delivery driver, according to the store policy; and
when the delivery eligibility for the order is negative or when the delivery driver is the associate driver, the tipping eligibility for the delivery driver is negative.

18. The method of claim 11, wherein the tipping request is revoked after an expiration time period according to the store policy.

19. The method of claim 11 further comprising:
providing a review request to be rendered on the second user interface for the display device; and
receiving a review result from the user, in response to the review request.

20. The method of claim 11, wherein the tipping request comprises one or more proposed tips determined based on:
one or more predetermined percentages of a total amount of the order; or
one or more predetermined fixed amounts.

\* \* \* \* \*